United States Patent
Dasgupta

(10) Patent No.: US 12,552,840 B2
(45) Date of Patent: Feb. 17, 2026

(54) IDENTIFICATION OF INHIBITOR PEPTIDES TO BIND WITH N-TERMINAL SPIKE (S) AND NONSTRUCTURAL PROTEIN (NSP) SEQUENCES OF SARS-COV2 B.1.617.2 DELTA OR OMICRON VARIANTS ALONE AND COMBINATION WITH DRUG(S) FOR TARGETED ANTIVIRAL THERAPY

(71) Applicant: Subhajit Dasgupta, Charleston, SC (US)

(72) Inventor: Subhajit Dasgupta, Charleston, SC (US)

(*) Notice: Subject to any disclaimer, the term of this patent is extended or adjusted under 35 U.S.C. 154(b) by 836 days.

(21) Appl. No.: 17/736,755

(22) Filed: May 4, 2022

(65) Prior Publication Data
US 2023/0250136 A1    Aug. 10, 2023

Related U.S. Application Data

(60) Provisional application No. 63/307,232, filed on Feb. 7, 2022.

(51) Int. Cl.
*C07K 14/165* (2006.01)
*A61P 31/14* (2006.01)

(52) U.S. Cl.
CPC ............ *C07K 14/165* (2013.01); *A61P 31/14* (2018.01)

(58) Field of Classification Search
None
See application file for complete search history.

(56) References Cited

PUBLICATIONS pp. 1-9, Düzgüne et al., Pathogens 2021, 10(12), 1599; https://doi.org/10.3390/pathogens10121599 (Year: 2021).*
pp. 10-18, Düzgüne et al., Pathogens 2021, 10(12), 1599; https://doi.org/10.3390/pathogens10121599 (Year: 2021).*
pp. 19-27, Düzgüne et al., Pathogens 2021, 10(12), 1599; https://doi.org/10.3390/pathogens10121599 (Year: 2021).*

* cited by examiner

*Primary Examiner* — Shanon A. Foley
*Assistant Examiner* — Myron G Hill

(57) ABSTRACT

The identified peptide sequences form moderate to strong heterodimeric complexes with SARS-COV2 (B.1.617.2) virus Spike envelope proteins and a range of virus nonstructural protein sequences NSP1-14. These identified peptides are proposed to use in antiviral immunotherapy and supportive combination with chemical compound(s) for chemotherapy. The sequence ID of the identified peptides are, Seq1: ISD1, Seq2: ISD2, Seq3: ISD3, Seq4: ISD4, Seq5: ISD5, Seq6: ISD6, Seq7 Ip2, Seq8: Ip1, Seq9: Ip3, Seq10: Ip5, Seq11: Ip7, Seq12: Ip8, Seq13: Ip9, Seq14: SOI1, Seq15: SOI2, Seq16: SOI5, Seq17: SOI7, Seq18: SOI9, Seq19: SO10, Seq20: SO11.

Figure 1:
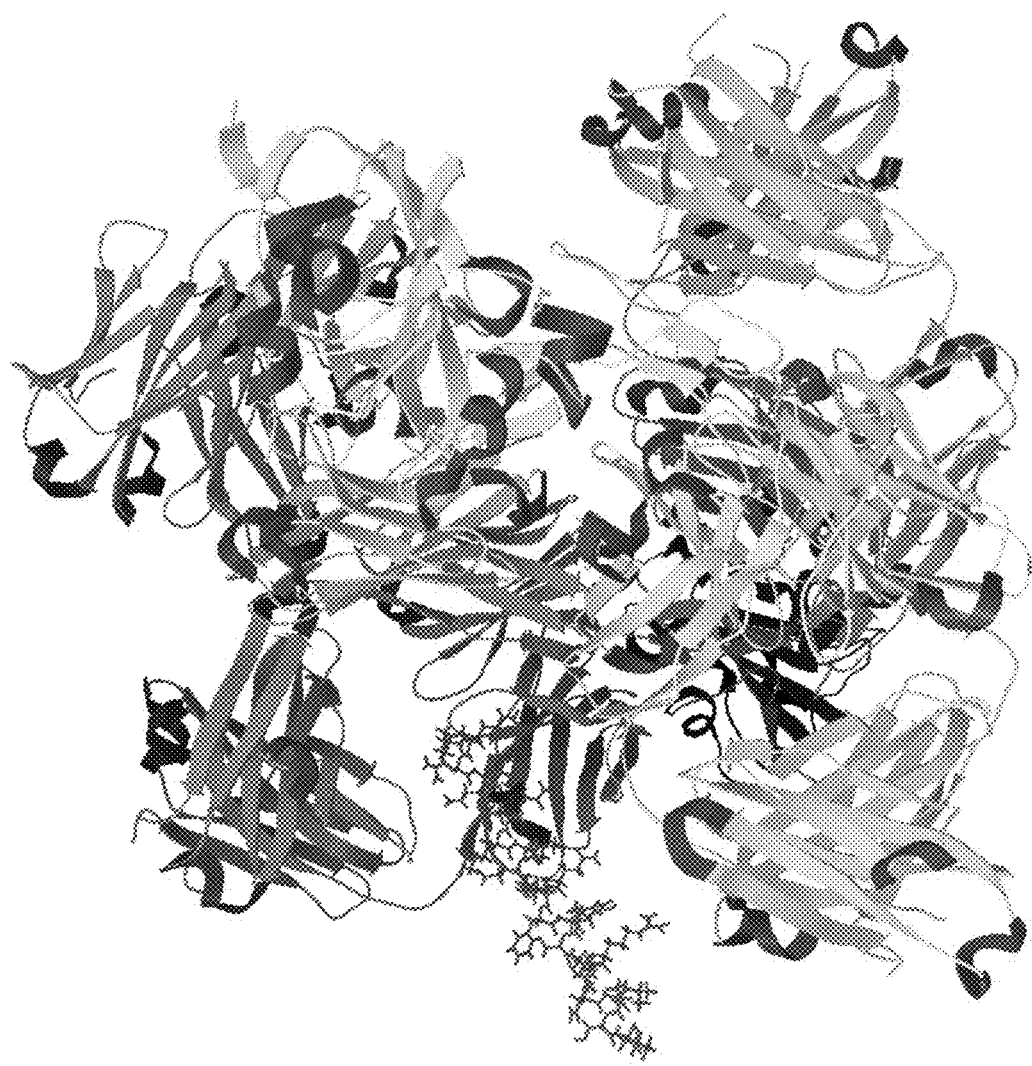

3 Claims, 8 Drawing Sheets
Specification includes a Sequence Listing.

IDENTIFICATION OF INHIBITOR PEPTIDES TO BIND WITH N-TERMINAL SPIKE (S) AND NONSTRUCTURAL PROTEIN (NSP) SEQUENCES OF SARS-COV2 B.1.617.2 DELTA OR OMICRON VARIANTS ALONE AND COMBINATION WITH DRUG(S) FOR TARGETED ANTIVIRAL THERAPY

CROSS REFERENCES TO RELATED APPLICATIONS

The last 5 years literature search shows limited approach towards development of successful drug and/or inhibitor protein/peptide sequences for the virus. The research publications on SARS-COV2 inhibitors are cited have contemporary importance in context of our patent application. The bibliographic references are presented below:

BIBLIOGRAPHY

ZHOU, H., YANG, J., ZHOU, C., CHEN, B., FANG, H., CHEN, S., ZHANG, X., WANG, L. & ZHANG, L. 2021. A Review of SARS-CoV2: Compared With SARS-CoV and MERS-CoV. *Front Med (Lausanne)*, 8, 628370.

XIU, S., DICK, A., JU, H., MIRZAIE, S., ABDI, F., COCKLIN, S., ZHAN, P. & LIU, X. 2020. Inhibitors of SARS-CoV-2 Entry: Current and Future Opportunities. *J Med Chem*, 63, 12256-12274.

SCHUTZ, D., RUIZ-BLANCO, Y. B., MUNCH, J., KIRCHHOFF, F., SANCHEZ-GARCIA, E. & MULLER, J. A. 2020. Peptide and peptide-based inhibitors of SARS-CoV-2 entry. *Adv Drug Deliv Rev*, 167, 47-65.

CHENG, Y. W., CHAO, T. L., LI, C. L., CHIU, M. F., KAO, H. C., WANG, S. H., PANG, Y. H., LIN, C. H., TSAI, Y. M., LEE, W. H., TAO, M. H., HO, T. C., WU, P. Y., JANG, L. T., CHEN, P. J., CHANG, S. Y. & YEH, S. H. 2020. Furin Inhibitors Block SARS-CoV-2 Spike Protein Cleavage to Suppress Virus Production and Cytopathic Effects. *Cell Rep*, 33, 108254.

KAI, H. & KAI, M. 2020. Interactions of coronaviruses with ACE2, angiotensin II, and RAS inhibitors-lessons from available evidence and insights into COVID-19. *Hypertens Res*, 43, 648-654.

HIRSCH, J. S., NG, J. H., ROSS, D. W., SHARMA, P., SHAH, H. H., BARNETT, R. L., HAZZAN, A. D., FISHBANE, S., JHAVERI, K. D., NORTHWELL, C.-R. C. & NORTHWELL NEPHROLOGY, C.-R. C. 2020. Acute kidney injury in patients hospitalized with COVID-19. *Kidney Int*, 98, 209-218.

DE LUCA, G., NARDIN, M., ALGOWHARY, M., UGUZ, B., OLIVEIRA, D. C., GANYUKOV, V., ZIMBAKOV, Z., CERCEK, M., JENSEN, L. O., LOH, P. H., CALMAC, L., ROURA FERRER, G., QUADROS, A., MILEWSKI, M., SCOTTO DI UCCIO, F., VON BIRGELEN, C., VERSACI, F., TEN BERG, J., CASELLA, G., LUNG, A. W. S., KALA, P., DIEZ GIL, J. L., CARRILLO, X., DIRKSEN, M., BECERRA-MUNOZ, V. M., LEE, M. K., JUZAR, D. A., DE MOURA JOAQUIM, R., PALADINO, R., MILICIC, D., DAVLOUROS, P., BAKRACESKI, N., ZILIO, F., DONAZZAN, L., KRAAIJEVELD, A., GALASSO, G., LUX, A., MARINUCCI, L., GUIDUCCI, V., MENICHELLI, M., SCOCCIA, A., YAMAC, A. H., MERT, K. U., FLORES RIOS, X., KOVARNIK, T., KIDAWA, M., MOREU, J., FLAVIEN, V., FABRIS, E., MARTINEZ-LUENGAS, I. L., BOCCALATTE, M., BOSA OJEDA, F., ARELLANO-SERRANO, C., CAIAZZO, G., CIRRINCIONE, G., KAO, H. L., SANCHIS FORES, J., VIGNALI, L., PEREIRA, H., MANZO, S., ORDONEZ, S., ARAT OZKAN, A., SCHELLER, B., LEHTOLA, H., TELES, R., MANTIS, C., ANTTI, Y., BRUM SILVEIRA, J. A., ZONI, R., BESSONOV, I., SAVONITTO, S., KOCHIADAKIS, G., ALEXOPULOS, D., URIBE, C. E., KANAKAKIS, J., FAURIE, B., GABRIELLI, G., GUTIERREZ BARRIOS, A., BACHINI, J. P., ROCHA, A., TAM, F. C., RODRIGUEZ, A., LUKITO, A. A., SAINTJOY, V., PESSAH, G., TUCCILLO, A., CORTESE, G., PARODI, G., BOURAGHDA, M. A., KEDHI, E., LAMELAS, P., SURYAPRANATA, H. & VERDOIA, M. 2021. Renin-angiotensin system inhibitors and mortality among diabetic patients with STEMI undergoing mechanical reperfusion during the COVID-19 pandemic. *Diabet Epidemiol Manag*, 4, 100022.

KURBEL, S. 2021. The renin-angiotensin system in COVID-19: Why ACE2 targeting by coronaviruses produces higher mortality in elderly hypertensive patients? *Bioessays*, 43, e2000112.

DASGUPTA, S. & BANDYOPADHYAY, M. 2021. Molecular docking of SARS-COV-2 Spike epitope sequences identifies heterodimeric peptide-protein complex formation with human Zo-1, TLR8 and brain specific glial proteins. *Med Hypotheses*, 157, 110706.

ARTESE, A., SVICHER, V., COSTA, G., SALPINI, R., DI MAIO, V. C., ALKHATIB, M., AMBROSIO, F. A., SANTORO, M. M., ASSARAF, Y. G., ALCARO, S. & CECCHERINI-SILBERSTEIN, F. 2020. Current status of antivirals and druggable targets of SARS CoV-2 and other human pathogenic coronaviruses. *Drug Resist Updat*, 53, 100721.

BANERJEE, R., PERERA, L. & TILLEKERATNE, L. M. V. 2021. Potential SARS-CoV-2 main protease inhibitors. *Drug Discov Today*, 26, 804-816.

CITARELLA, A., SCALA, A., PIPERNO, A. & MICALE, N. 2021. SARS-CoV-2 M(pro): A Potential Target for Peptidomimetics and Small-Molecule Inhibitors. *Biomolecules*, 11.

FISCHER, A., SELLNER, M., MITUSINSKA, K., BZOWKA, M., LILL, M. A., GORA, A. & SMIESKO, M. 2021. Computational Selectivity Assessment of Protease Inhibitors against SARS-CoV-2. *Int J Mol Sci*, 22.

SABBAH, D. A., HAJJO, R., BARDAWEEL, S. K. & ZHONG, H. A. 2021. An Updated Review on SARS-CoV-2 Main Proteinase (M(Pro)): Protein Structure and Small-Molecule Inhibitors. *Curr Top Med Chem*, 21, 442-460.

SACCO, M. D., MA, C., LAGARIAS, P., GAO, A., TOWNSEND, J. A., MENG, X., DUBE, P., ZHANG, X., HU, Y., KITAMURA, N., HURST, B., TARBET, B., MARTY, M. T., KOLOCOURIS, A., XIANG, Y., CHEN, Y. & WANG, J. 2020. Structure and inhibition of the SARS-CoV-2 main protease reveal strategy for developing dual inhibitors against M(pro) and cathepsin L. *Sci Adv*, 6.

SHAJI, D., YAMAMOTO, S., SAITO, R., SUZUKI, R., NAKAMURA, S. & KURITA, N. 2021. Proposal of novel natural inhibitors of severe acute respiratory syndrome coronavirus 2 main protease: Molecular docking and ab initio fragment molecular orbital calculations. *Biophys Chem*, 275, 106608.

TEJERA, E., MUNTEANU, C. R., LOPEZ-CORTES, A., CABRERA-ANDRADE, A. & PEREZ-CASTILLO, Y. 2020. Drugs Repurposing Using QSAR, Docking and Molecular Dynamics for Possible Inhibitors of the SARS-CoV-2 M(pro) Protease. *Molecules*, 25.

ULLRICH, S. & NITSCHE, C. 2020. The SARS-CoV-2 main protease as drug target. *Bioorg Med Chem Lett,* 30, 127377.

FEDERALLY SPONSORED RESEARCH OR DEVELOPMENT

Not applicable.

The invention research did not receive any fund from any federally sponsored or private Grantor organizations.

NAME OF THE PARTIES TO A JOINT RESEARCH AGREEMENT

Not applicable.

```
5. REFERENCE TO A SEQUENCE LISTING
The sequence listing text file (16.5 KB,
File name lnhibitor_peptides; created on
January 2022) is submitted via EFS with
the application. The text file is attached
in EFS with the application.
Street: 505 Tribeca Dr. FL R2
 City: Charleston
 State: South Carolina
 Country: USA
 PostalCode: 294149042
 PhoneNumber: 8437547370
 FaxNumber:
 EmailAddress:
<110> LastName: Dasgupta
<110> FirstName: Subhajit
<110> Middlelnitial:
<110> Suffix:
Application Project
----------------
<120> Title: Identification of inhibitor
peptides to modify Spike (S) and
nonstructural protein (NSP) sequences
of SARS-COV2 and Delta,
Omicron variants for targeted antiviral therapy
<130> AppFileReference: Inhibitor_peptides
<140> CurrentAppNumber:
<141 > CurrentFilingDate:_____-__-__
Sequence
--------
<213> OrganismName: SARSCOV2 (B.1.617.2)
<400> PreSequenceString:
RQVGGENNNS KCLGECQQFD YARRGNLASK          30
<212> Type: PRT
<211> Length: 30
 SequenceName: ISD1
 SequenceDescription:
Sequence
--------
<213> OrganismName: SARS-COV2 (B.1.617.2)
<400> PreSequenceString:
KDYYLVGLGN IDDEASLWW ICASMHSAGY           30
<212> Type: PRT
<211> Length: 30
 SequenceName: ISD2
 SequenceDescription:
Sequence
--------
<213> OrganismName: SARS-COV2 (B.1.617.2)
<400> PreSequenceString:
SLQARNNHFD NYGRYQAVYS CNTKQTSYVA          30
<212> Type: PRT
<211> Length: 30
 SequenceName: ISD3
 SequenceDescription:
```

```
-continued
Sequence
--------
<213> OrganismName: SARS-COV2 (B.1.617.2)
<400> PreSequenceString:
NAGENEQRRN IQGNDDIALS NYEAGSVIE           29
<212> Type: PRT
<211> Length: 29
 SequenceName: ISD4
 SequenceDescription:
Sequence
--------
<213> OrganismName: SARS-COV2 (B.1.617.2)
<400> PreSequenceString:
EGGIDARYRD KKKLSAYGER ADERRSYVG           29
<212> Type: PRT
<211> Length: 29
 SequenceName: ISD5
 SequenceDescription:
Sequence
--------
<213> OrganismName: SARS-C0V2 (B.1.617.2)
<400> PreSequenceString:
AQVGRNYSLL EQRDRRYSVI GADEQDDDVA          30
<212> Type: PRT
<211 > Length: 30
 SequenceName: ISD6
 SequenceDescription:
Sequence
--------
<213> OrganismName: SARS-C0V2 (B.1.617.2)
<400> PreSequenceString:
AAAQWYYYIIIRRWWVCC CAAATYYLL              29
<212> Type: PRT
<211> Length: 29
 SequenceName: Ip2
 SequenceDescription:
Sequence
--------
<213> OrganismName: SARS-COV2 (B.1.617.2)
<400> PreSequenceString:
VSSTTTWAAA APIIHCCCCQ DKLLLMYYYV          30
<212> Type: PRT
<211> Length: 30
 SequenceName: Ip1
 SequenceDescription:
Sequence
--------
<213> OrganismName: SARS-C0V2 (B.1.617.2)
<400> PreSequenceString:
VVVYYYYWW NNNQCCLLLL VVVDDDDGFF           30
<212> Type: PRT
<211 > Length: 30
 SequenceName: Ip3
 SequenceDescription:
Sequence
--------
<213> OrganismName: SARS-C0V2 (B.1.617.2)
<400> PreSequenceString:
SSSMGGTRRR VVKCDDDDNN AAAYYRQEEE          30
<212> Type: PRT
<211> Length: 30
 SequenceName: Ip5
 SequenceDescription:
Sequence
--------
<213> OrganismName: SARS-COV2 (B.1.617.2)
<400> PreSequenceString:
RRQGGGGSYY YGGPHVVVVI RNNNYRREQG G        31
<212> Type: PRT
<211> Length: 31
 SequenceName: Ip7
 SequenceDescription:
Sequence
--------
<213> OrganismName: SARS-COV2 (B.1.617.2)
<400> PreSequenceString:
RVVVVTTVEE GATQSSSLVR QDDNKLLLRA N        31
<212> Type: PRT
<211 > Length: 31
 SequenceName: Ip8
 SequenceDescription:
```

-continued

```
Sequence
--------
<213> OrganismName: SARS-COV2 (B.1.617.2)
<400> PreSequenceString:
NNNGFFQNVG GLDMRRRQVA CWLLLTVVRN          30
<212> Type: PRT
<211> Length: 30
 SequenceName: Ip9
 SequenceDescription:
Sequence
--------
<213> OrganismName: SARS-COV2 (B.1.617.2)
<400> PreSequenceString:
ECAPKNEEGR YEEVAQTSFF TRERNSAGYD          30
<212> Type: PRT
<211> Length: 30
 SequenceName: SOU
 SequenceDescription:
Sequence
--------
<213> OrganismName: SARS-COV2 (B.1.617.2)
<400> PreSequenceString:
NNDCGASFRG EYSAGDRKEA SYNDIALSEV          30
<212> Type: PRT
<211 > Length: 30
 SequenceName: SOI2
 SequenceDescription:
Sequence
--------
<213> OrganismName: SARS-COV2 (B.1.617.2)
<400> PreSequenceString:
DEEAKNYSLL QDRDAKLGVA GDDISLNYSG          30
<212> Type: PRT
<211> Length: 30
 SequenceName: SOI5
 SequenceDescription:
Sequence
--------
<213> OrganismName: SARS-COV2 (B.1.617.2)
<400> PreSequenceString:
QRRNGLFRAY SLGIGKSLAY DYKGSQYDVL          30
<212> Type: PRT
<211> Length: 30
 SequenceName: SOI7
 SequenceDescription:
Sequence
--------
<213> OrganismName: SARS-COV2 (B.1.617.2)
<400> PreSequenceString:
SKRRADYSEA RNYVKSAEGR ASSEGSAERD          30
<212> Type: PRT
<211 > Length: 30
 SequenceName: SO19
 SequenceDescription:
Sequence
--------
<213> OrganismName: SARS-COV2 (B.1.617.2)
<400> PreSequenceString:
DEQGSAGNSQ IESQQNGVSQ DDKGEDNSRL          30
<212> Type: PRT
<211> Length: 30
 SequenceName: SO10
 SequenceDescription:
Sequence
--------
<213> Organism Name: SARS-COV2 (B.1.617.2)
<400> PreSequenceString:
RKKYGRNYDS LSYKDQQASI SQGENDDKEQ D        31
<212> Type: PRT
<211> Length: 31
 Sequence Name: SO11
 Sequence Description:
```

BACKGROUND OF THE INVENTION

The Severe Acute Respiratory Syndrome (SARS) Corona virus 2 (SARS-COV2) is the etiological agent of recent pandemic (COVID-19) (end of 2019 till 2021 and continuing). The search for the origin of COVID-19 indicated that the virus has zoonotic origin and found to infect the people of Wuhan, China first. The COVID-19 infection has close similarity with Influenza virus as it starts with blank cough, headache, upper respiratory Tract discomfort to lower respiratory tract illness pneumonia, respiratory distress, asphyxia with fever ended up to coma. The point-source infection eventually turned into global pandemic mostly through international traveling all over the world.

Though, there is a relationship between the recent SARS-COV2 with other closely related Corona viruses like, MERS-CoV, HCoV-229E, HCoV-HKU1, HCoV-NL63, HCoV-0C43 (1) which prevail since a decade at least, there is no successful therapeutic interventions developed to prevent virus spread.

SARS-CoV, MERS-CoV and SARS-COV2 are under genus betacoronavirus which infect birds and bat as primary hosts. The mechanism of infectivity and severity of SARS-COV2 in human depends on (a) entry of virus; (b) replication mechanism of virus within host cells; (c) escape mechanism of progeny viruses from hosts' immune response mediated killing process; (d) genetic susceptibility of hosts and (e) mutation in virus Spike and replicase proteins. Recent advancement shows spread of mutant virus variants (variant of concerns): Delta, Kappa, Omicron in certain parts of the world including United States. These variants have considerable numbers of mutations in their single stranded RNA genome which develop new viral protein sequences. As found Delta variant was more virulent than Omicron. The reservoir, if any, for the viruses, other than infected human beings, is still unknown. Still, it can be predicted closely that, infected domestic animals, birds can act as reservoirs for these variants in the communities where we find spread of infection.

The treatment is still obscure for COVID-19, only experimental medications and supportive treatments are there rather than targeted antiviral therapy. The recent outcome of RNA vaccines has limited success to reduce SARS-COV2 infection. The vaccines are also expected to reduce Delta and Omicron infection.

Recent investigations demonstrate inhibitors to block SARS-COV2 entry (2-4). This is one of the current aspects of immunotherapy approaches besides vaccine preparation. Available reports published in NCBI PubMed, and Google Scholar sites indicate viruses are found to attach with Angiotensin Converting Enzyme 2 (ACE2) and therefore modify blood pressure level and causes hypertension with acute kidney infection (5, 6). However, investigations demonstrate variable outcomes of ACE2 inhibition in different age groups and preexisting disease conditions like diabetes (7, 8). Our molecular dynamics and docking experiments demonstrate different non-ACE2 proteins like innate immune responder Toll-like receptor-8 (TLR8), tight junction protein Zonula Occludens (Zo), glial activation protein NDRG2, Apo S100B have strong propensity to bind with SARS-COV2 Spike protein derived peptides (9).

The current research indicates role of protease inhibitors in attenuation of SARS-COV2 infection. Several investigations demonstrated role of viral main protease (Mpro) during infection and propose to develop drug and peptide blockers (10-18).

In the patent application, we provide the invented inhibitor peptide sequences developed from immunodominant proteins of SARS-COV2 (B.1.617.2) and its Delta, Omicron variants.

BRIEF SUMMARY OF INVENTION

In continuation of our research, we screened immunodominant B cell epitope—peptides (antibody binding sites) from SARS-COV2 Delta Variant (B.1.617.2) Spike protein N-terminal sequences (7ORB_R, 7SOA_A) by using IEDB epitope Tool (NIAID) and took these virus peptides as templates to construct peptide inhibitors aimed to bind with specific sequences of Spike glycoprotein to prevent virus entry. Also, we identified inhibitor sequences for Open Reading Frame 1ab (ORF1ab) to target virus nonstructural protein sequences (NSP1-14). The binding parameters are determined from the closest and overlapping position of inhibitor and virus peptide sequences to construct stable heterodimeric structures. The Dimer Packing Quality Values (FSCOR) are obtained from each set of dimeric structure by Preddimer NMR structure analysis software showing highest FSCOR value is the best dimeric structure conformation. We also evaluated specificity of the identified inhibitors to bind SARS-COV2 Delta variant (B.1.617.2) and related protein sequences. Our observations show all these inhibitors have different degrees of binding efficiency including the strongest to moderate to minimum abilities to form heterodimer complexes. Thus, we provide evidence of new peptide inhibitors to block functions of immunodominant regions of (a) Spike envelope protein and (b) nonstructural proteins (NSP1-12) of SARS-COV2 and its Delta variants including Omicron. The patent application includes invented inhibitor peptide sequences against immunodominant protein sequences of SARS-COV2 (B.1.617.2) including Delta and Omicron variants.

8. BRIEF DESCRIPTION OF THE SEVERAL VIEWS OF DRAWING(S)

FIG. 1. Molecular Docking and digital analysis of binding between inhibitor peptide ISD1 (chocolate brown ball and stick structure) [SEQ1] and SARS-COV2 (B.1.617.2) Delta variant N-terminal Spike S1 protein 7ORB_R sequence (Tertiary protein structure; alpha helix: red and pleated structure: yellow).

Figure 2:

FIG. 2. Molecular Docking and digital analysis of binding between inhibitor peptide ISD3 (green ball and stick structure) [SEQ3] and SARS-COV2 (B.1.617.2) Delta variant N-terminal Spike S1 protein 7ORB_R sequence (Tertiary protein structure; alpha helix: red and pleated structure: yellow).

Figure 3:
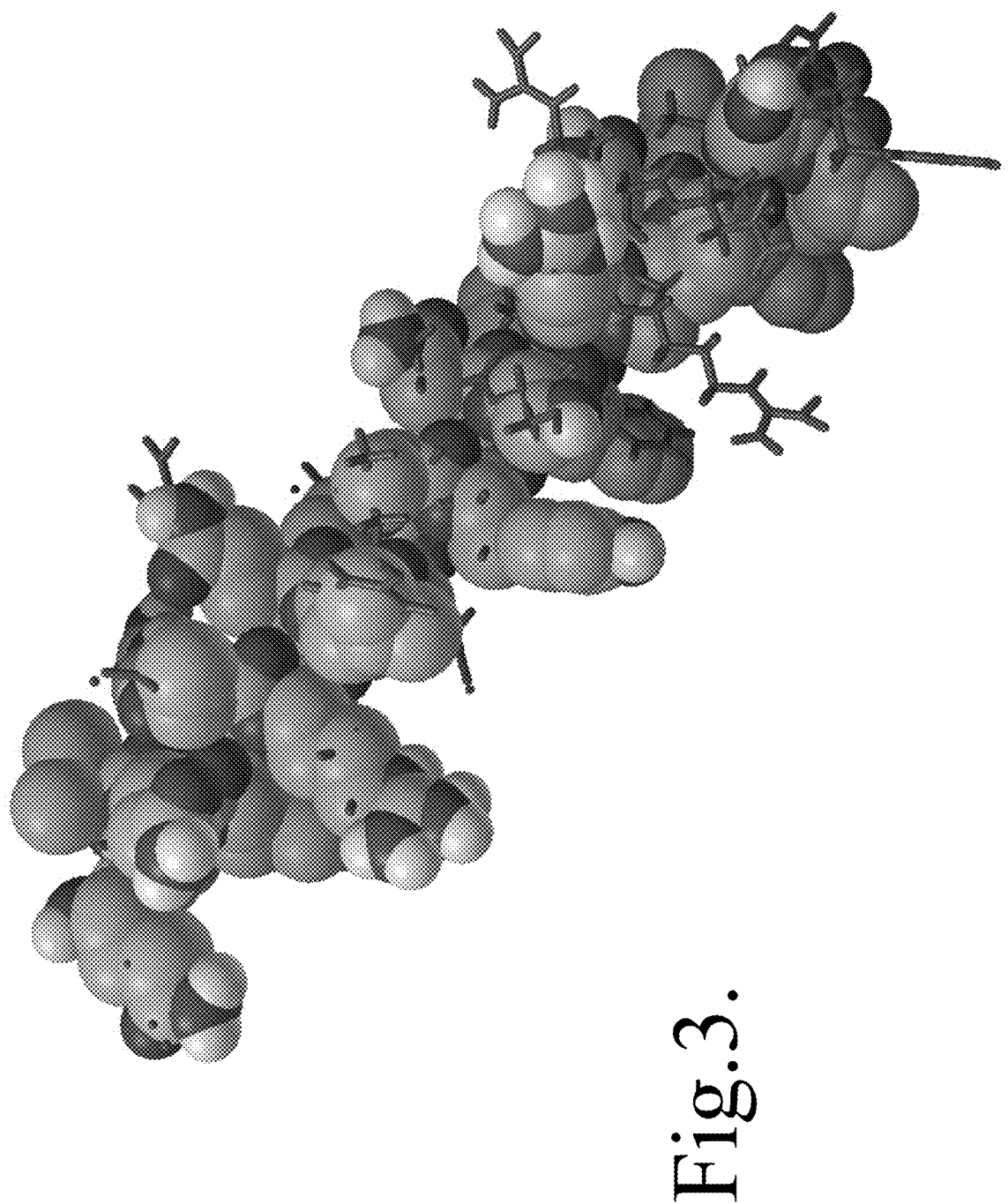

FIG. 3. Molecular Docking and digital analysis of binding between inhibitor peptide SO11(blue ball and stick structure) [SEQ14] and SARS-COV2 (B.1.617.2) Delta variant N-terminal Spike S1 protein sequence (SOA1: 3D atomic structure) [SEQ28].

Figure 4:

FIG. 4. Molecular Docking and digital analysis of binding between inhibitor peptide S04 [SEQ51](deep green ball and stick structure) and SARS-COV2 (B.1.617.2) Delta variant N-terminal Spike S1 protein sequence (SOA4: 3D atomic structure) [SEQ31].

Figure 5:
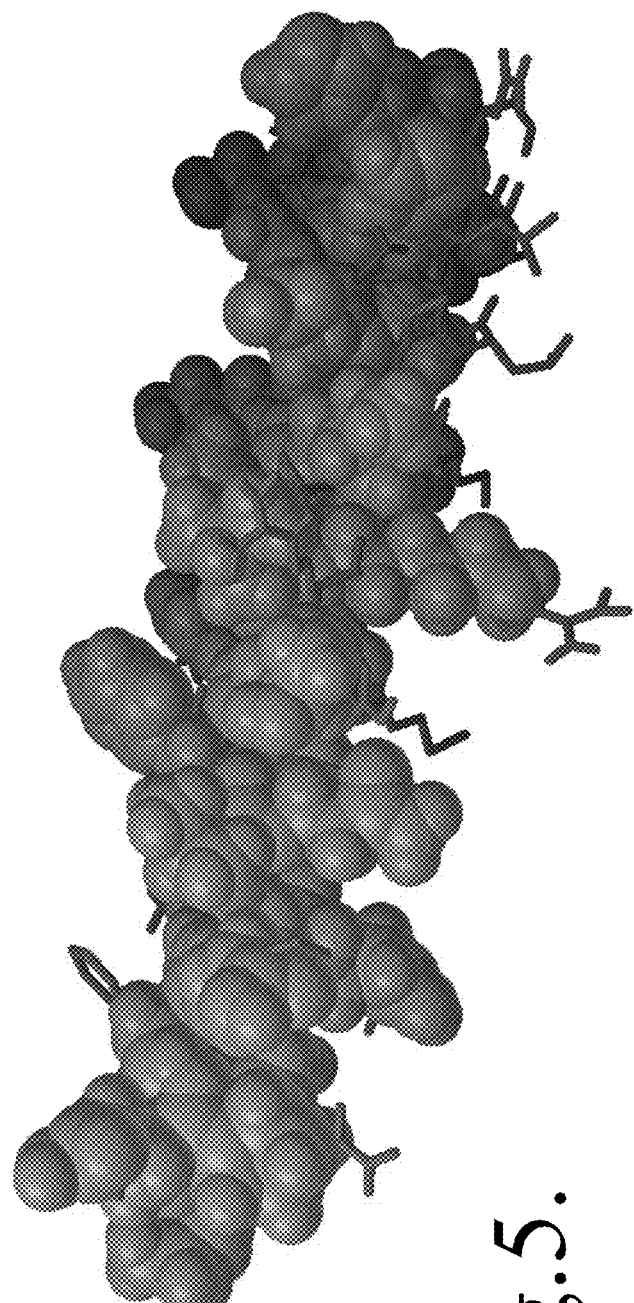

FIG. 5. Molecular Docking and digital analysis of binding between ORF1ab inhibitor peptide lp9L (pink ball and stick structure) [SEQ13] and SARS-COV2 (B.1.617.2) Delta variant Open Reading Frame ORflab selected protein sequence (protein sequence Ep9L [SEQ49]: 3D atomic structure).

Figure 6:
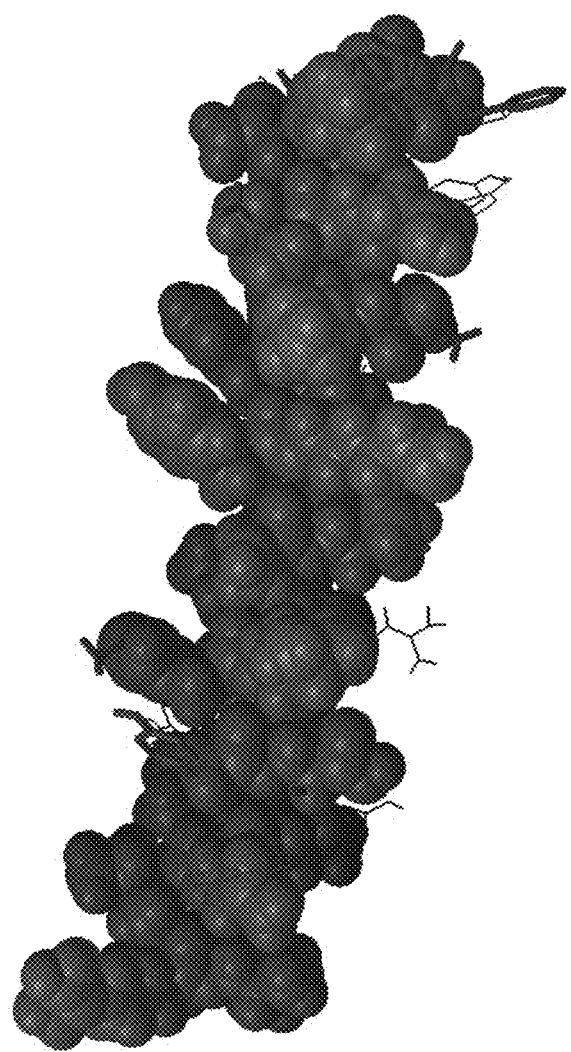

FIG. 6. Molecular Docking and digital analysis of binding between inhibitor peptide lp2L [SEQ7](green ball and stick structure), Ip4L [SEQ52] (purple ball stick model) and SARS-COV2 (B.1.617.2) ORF1ab sequence EP2L [SEQ42].

Figure 7:

FIG. 7. Molecular docking experiment demonstrates binding of antiviral drug Remdesivir and peptide inhibitor S05 [SEQ16] combination with SARS-COV2 B.1.617.2 Delta/Omicron Spike protein 7ORB_R (Remdesivir (CID 56832906): Green 3D atomic structure; S05 [SEQ16]: ball and stick and 7ORB_R: tertiary protein structure).

Figure 8:
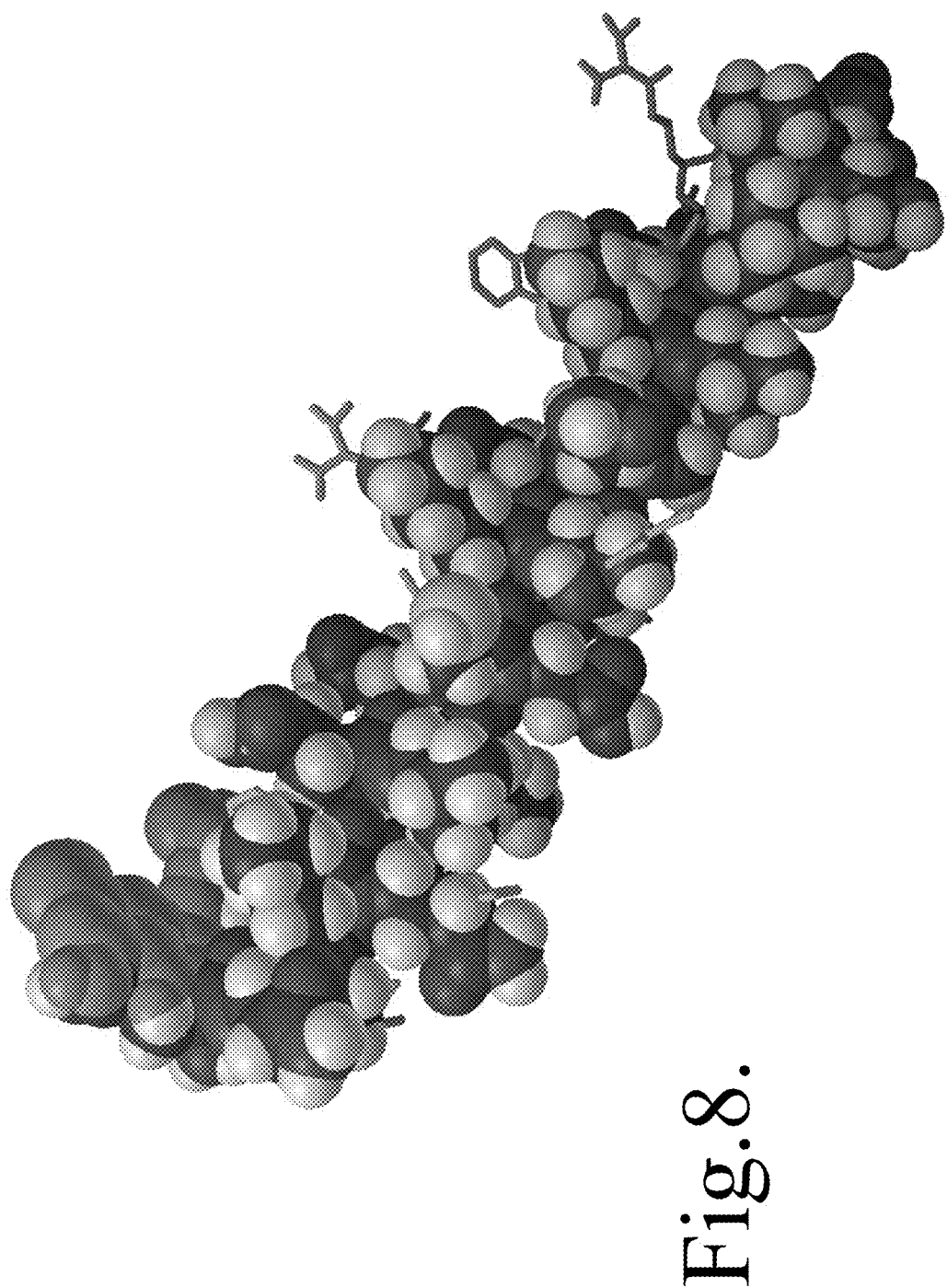

FIG. 8. Molecular docking experiment demonstrates binding of anti-HIV drug Efavirenz (ID: CHEMBL1309, PubChem) and identified peptide inhibitor lp9L (green ball and stick structure) [SEQ13] combination with SARS-COV2 B.1.617.2 Delta/Omicron Open Reading Frame ORF1ab (NSP1-14) truncated peptide sequence E10L [SEQ50] (Efavirenz: purple 3D atomic structure; E10L: 3D atomic structure).

DETAILED DESCRIPTION OF THE INVENTION

A. Protein Sequence Selection.

We selected SARS-COV2 (B.1.617.2) protein sequences from NCBI, Protein database. The sequences are, 7ORB_R 1-205 amino acid sequence); 7SOA_A (SARS coronavirus Tor2), Sequence ID: NP_828849.7 (7073 amino acid).

The selected virus protein sequences are transformed into corresponding FASTA sequences by using NCBI PubMed software system.

The FASTA sequences were fed individually to IEDB Tools linear B cell epitope identification software (Bepipred linear epitope prediction tool, IEDB).

The immunodominant sequences which exhibit potential antibody binding sites and amino acids are selected for construction of peptide inhibitor.

Random shuffling of amino acids was performed to construct each identified peptide inhibitors corresponding to immunodominant virus protein sequences.

The inhibitor peptide sequences, and corresponding virus peptides obtained from protein sequences are named to identify them individually and kept for record.

B. Experiments to Determine Efficacy of Invented Inhibitor Peptides

The physical parameters like hydrophobicity values, pH/isoelectric point of the peptide, Mass, Extinction coefficient, polarity of amino acids in peptide sequence are determined by using chemistry software pepDraw (USA) and Avogadro (USA). The 30 amino acid inhibitor peptide sequences were then chosen for determining their efficacy to form heterodimeric structures with viral peptide sequences at the best fit to least fit orders at pH7-7.2. We use Preddimer software for transmembrane membrane alpha helical protein sequence interaction study purposes.

C. Results of the Experiments

The results are presented in the Tables 1, 2 and 3. The Preddimer heterodimer identification software demonstrated several models. The higher values of FSCOR (Dimer Packing Quality) are chosen as determining value for the best fit heterodimers thus confirm the binding affinity of inhibitor peptides with viral protein sequences for neutralization purposes. The PDB format of all the invented Inhibitor sequences and immunodominant virus peptides are constructed to determine the three-dimensional interaction pattern between them. We chose molecular docking and molecular dynamics experiments to find out confirmation of inhibitor peptide interaction with viral protein sequences and visualize.

TABLE 1

Dimer packing quality value (FSCOR) of identified inhibitor sequences bind with SARS-COV2 Delta variant (B.1.617.2) Spike peptide ORB_R (SSD) to form heterodimeric structures.

| SARS-COV2 (B.1.617.2) selective peptide sequences | Inhibitor peptides | FSCOR value[‡] |
|---|---|---|
| SSD1_30 [SEQ 21] | ISD1 [SEQ 1] | 370.885, 299.741, 15.313, 13.054, 12.787, 9.198, 2.936, −0.476, −7.205 |
| SSD61_91 [SEQ 23] | | 1.173, 1.009, 1.009, 0.993, 0.915, 0.633 |
| SSD152_180 [SEQ 26] | | 6.343, 5.089, 2.731, 1.704, 1.68, 0.694, 0.134, −0.322 |
| SSD181-205 [SEQ 27] | | 5.143, 3.997, 3.581, 3.079, 2.938, 1.55, 0.193 |
| SSD1_30 [SEQ 21] | ISD3 [SEQ 3] | 3.336, 2.346, 2.212, 2.117, 1.952, 1.589, 1.247 |
| SSD31_60 [SEQ 22] | | 2.818, 2.643, 2.42, 2.386, 1.943, 1.872, 1.184, 0.803 |
| SSD61_91 [SEQ 23] | | 3.463, 2.842, 2.611, 2.388, 2.062, 1.771 |
| SSD92_120 [SEQ 24] | | 2.339, 2.303, 2.067, 2.058, 1.979 |
| SSD181_205 [SEQ 27] | | 2.221, 2.028, 1.993, 1.657, 1.504 |
| SSD92_120 [SEQ 24] | ISD5 [SEQ 5] | 5.324, 0.838, 0.641, 0.487, −0.423 |
| SSD121_151 [SEQ 25] | | 27.908, 12.36, 5.447, 1.446, 0.958, 0.877, 0.802, 0.744, 0.682, 0.665, 0.419, 0.249, 0.214 |
| SSD152_180 [SEQ 26] | | 0.883, 0.829, 0.657, 0.496, 0.387, 0.309, 0.052 |
| SSD181_205 [SEQ 27] | | 89.463, 2.751, 0.113, −0.013, −5.856 |
| | ISD2 [SEQ 2] | NOT DONE (N.D) |
| | ISD4 [SEQ 4] | N.D |
| | ISD6 [SEQ 6] | N.D |

[‡]The peptides were submitted to Preddimer software analysis program for determining Dimer Packing Quality values ($F_{SCOR}$). The decreasing order of $F_{SCOR}$ value for each Inhibitor form heterodimers with different Spike peptides is mentioned in parenthesis (n). The software calculated the $F_{SCOR}$ values for each position of dimer formation by following equation involving crossing angle ($\chi$), and rotational angles ($\alpha 1$ and $\alpha 2$).: $F_{SCOR}$ = Pack + [Int + Env].

The term, Pack, indicates relative number of atoms within the structure; the term, Int, is the function accounting complementarity of hydrophobic properties on the helix-helix interface. The term, Env, is estimating correspondence of polar and structural properties of the dimer surface outside membrane lipid environment. The function (Int): ($\alpha 1$, $\alpha 2$, X, R, d); R is the distance between helical axes and d is the shift along the helical axis. The higher value of $F_{SCOR}$ indicates the best position of the stable dimer formed between the inhibitor and Spike peptides.

TABLE 2

Dimer packing quality value (FSCOR) of identified inhibitor sequences bind with SARS-COV2 Delta variant (B.1.617.2) Spike peptide SOA_A (SOA) to form heterodimeric structures.

| SARS-COV2 (B.1.617.2) selective peptide sequences | Inhibitor peptides | FSCOR value[‡] |
|---|---|---|
| SOA1 [SEQ 28] | SOI1 [SEQ 14] | 6.987, 1.797, 1.152, 0.985, 0.688, 0.575, 0.541, 0.291, −0.046, −0.135, −0.61, −2.306, −2.942 |
| SOA2 [SEQ 29] | | 5.004, 1.777, 1.281, 1.175, 1.148, 0.73, 0.361, 0.008, −0.126, −0.27, −3.743 |
| SOA4 [SEQ 31] | | 1.443, 1.358, 0.708, 0.706, 0.392, 0.124, −0.273 |
| SOA5 [SEQ 32] | | 1.165, 0.74, 0.604, 0.59, 0.504, 0.226, 0.136 |
| SOA9 [SEQ 37] | | 1.683, 1.334, 1.232, 1.074, 0.962, 0.93, 0.629, −1.422 |
| SOA3 [SEQ 30] | SOI4 | 2.32, 1.948, 1.889, 1.748, 1.649, 1.519, 1.256, 0.989, 0.938 |
| SOA4 [SEQ 31] | | 3.563, 3.082, 2.841, 2.663, 2.438, 2.432 |
| SOA5 [SEQ 32] | | 1.659, 1.224, 1.201, 1.161, 1.043, 0.822, 0.772 |
| SOA6 [SEQ 33] | | 1.327, 1.238, 0.629, 0.617, 0.526, 0.04 |
| SOA8 [SEQ 35] | | 2.467, 1.775, 1.746, 1.627, 1.441, 1.279 |

[‡]The peptides were submitted to Preddimer software analysis program for determining Dimer Packing Quality values (FSCOR). The decreasing order of FSCOR value for each Inhibitor form heterodimers with different Spike peptides is mentioned in parenthesis (n). The software calculated the $F_{SCOR}$ values for each position of dimer formation by following equation involving crossing angle ($\chi$), and rotational angles ($\alpha 1$ and $\alpha 2$).: FSCOR = Pack + [Int + Env].

The term, Pack, indicates relative number of atoms within the structure; the term, Int, is the function accounting complementarity of hydrophobic properties on the helix-helix interface. The term, Env, is estimating correspondence of polar and structural properties of the dimer surface outside membrane lipid environment. The function (Int): ($\alpha 1$, $\alpha 2$, X, R, d); R is the distance between helical axes and d is the shift along the helical axis. The higher value of FSCOR indicates the best position of the stable dimer formed between the inhibitor and Spike peptides.

TABLE 3

Dimer packing quality value (FSCOR) of identified inhibitor sequences bind with SARS-COV2 open reading frame (ORF 1ab) to form heterodimeric structures.

| SARS-COV2 selective ORF1ab peptide sequence | Inhibitors | FSCOR value[‡] |
|---|---|---|
| EP1 [SEQ 41] | Ip1 | 1.832, 1.76, 1.675, 1.644, 1.617, 1.465, 1.361, 1.055, 0.305, −0.22 |
| EP9 [SEQ 49] | Ip9 [SEQ 13] | 2.954, 2.452, 2.22, 1.649, 1.546, 0.794, −0.6812 |
| EP7 [SEQ 47] | Ip7 [SEQ 11] | 430.675, 3.761, 3.272, 1.724, 1.534, 1.358, 1.11, 1.072, −0.079, −0.811, −0.967 |
| EP6 [SEQ 46] | Ip6 | 1.906, 1.835, 1.502, 1.469, 1.301, 1.221, 1.047, 1.046, 0.733 |
| EP8 [SEQ 48] | Ip8 [SEQ 12] | 0.761, 0.513, 0.023, 0.004, −0.855, −1.774 |

[‡]The peptides were submitted to Preddimer software analysis program for determining Dimer Packing Quality values ($F_{SCOR}$). The decreasing order of $F_{SCOR}$ value for each Inhibitor form heterodimers with different Spike peptides is mentioned in parenthesis (n). The software calculated the $F_{SCOR}$ values for each position of dimer formation by following equation involving crossing angle ($\chi$), and rotational angles ($\alpha 1$ and $\alpha 2$).: $F_{SCOR}$ = Pack + [Int + Env].

The term, Pack, indicates relative number of atoms within the structure; the term, Int, is the function accounting complementarity of hydrophobic properties on the helix-helix interface. The term, Env, is estimating correspondence of polar and structural properties of the dimer surface outside membrane lipid environment. The function (Int): ($\alpha 1$, $\alpha 2$, X, R, d); R is the distance between helical axes and d is the shift along the helical axis. The higher value of $F_{SCOR}$ indicates the best position of the stable dimer formed between the inhibitor and Spike peptides.

| 12. SEQUENCE LISTING | | |
|---|---|---|
| Page Sequence | Title/Subtitle | Page(s) |
| 1 | Title of invention Identification of inhibitor peptides to bind with N-terminal Spike (S), nonstructural protein (NSP) sequences of SARS-COV2 B.1.617.2 Delta and Omicron variants for targeted antiviral therapy | 1 |
| 2 | Abstract of technical disclosure | 2 |
|  | Cross References | 3-6 |
| 3 | Statement for Federally sponsored research or development | 7 |
| 4 | The names of parties to a joint research agreement | 8 |

-continued

| 12. SEQUENCE LISTING | | |
|---|---|---|
| Page Sequence | Title/Subtitle | Page(s) |
| 5 | References to a sequence listing: [Text file of Sequence listing: (Inhibitor_peptides) is attached with application in EFS) | 9-16 |
| 6 | Background invention | 17, 18 |
| 7 | Brief summary of invention | 19 |
| 8 | Brief description of several views of drawing (The FIGS. 1 to 8 are attached as PDF file with application in EFS) | 20, 21 |
| 9 | Detail description of invention | 22-28 |
| 10 | Claim or claims | 29 |
| 11 | Abstract of disclosures | 30 |
| 12 | Sequence listing | 31 |

The invention claimed is:

1. One or more peptides comprising peptide SEQ ID No: 1 (ISD1) either alone or combination with any one or all selected from the group consisting of ISD2 (SEQ ID No: 2), ISD3 (SEQ ID No: 3), ISD4 (SEQ ID No: 4), ISD5 (SEQ ID No: 5) and ISD6 (SEQ ID No: 6) inhibitor sequences, and optionally an anti-viral drug, wherein the one or more peptides bind at least with at least one SARS-COV2 Delta variant Spike protein fragment selected from the group consisting of SEQ ID No: 21, SEQ ID No: 22, SEQ ID No: 23, SEQ ID No: 24, SEQ ID No: 25, SEQ ID No: 26, and SEQ ID No: 27, to generate heterodimeric structures.

2. One or more peptides comprising peptide SEQ ID No: 14 (SOI1) either alone or combination with any one or all selected from the group consisting of SOI2 (SEQ ID No: 15), SOI5 (SEQ ID No: 16), SOI7 (SEQ ID No: 17), SOI9 (SEQ ID No: 18), and SO10 (SEQ ID No: 19), and optionally an anti-viral drug, wherein the one or more peptides bind with at least one SARS-COV2 Delta variant Spike protein fragment of SEQ ID No: 28 or SEQ ID No: 29 or wherein the peptides bind with all sequences selected from the group consisting of SEQ ID No: 30, SEQ ID No: 31, SEQ ID No: 32, SEQ ID No: 33, and SEQ ID No: 35 to generate heterodimeric structures.

3. A peptide SEQ ID No: 11 (Ip7) wherein the peptide is capable of binding at least with SARS-COV2 Delta and Omicron variants Open Reading Frame ORF 1ab protein fragment SEQ ID No: 47 or all sequences SEQ ID No: 41, SEQ ID No: 46, SEQ ID No: 48, SEQ ID No: 49 to form heterodimeric structures.

* * * * *

SEQUENCE LISTING

<160> NUMBER OF SEQ ID NOS: 53

<210> SEQ ID NO 1
<211> LENGTH: 30
<212> TYPE: PRT
<213> ORGANISM: SARSCOV-2

<400> SEQUENCE: 1

Arg Gln Val Gly Gly Glu Asn Asn Ser Lys Cys Leu Gly Glu Cys
1               5                   10                  15

Gln Gln Phe Asp Tyr Ala Arg Arg Gly Asn Leu Ala Ser Lys
            20                  25                  30

<210> SEQ ID NO 2
<211> LENGTH: 30
<212> TYPE: PRT
<213> ORGANISM: SARSCOV-2

<400> SEQUENCE: 2

Lys Asp Tyr Tyr Leu Val Gly Leu Gly Asn Ile Asp Asp Glu Ala Ser
1               5                   10                  15

Leu Trp Val Val Ile Cys Ala Ser Met His Ser Ala Gly Tyr
            20                  25                  30

<210> SEQ ID NO 3
<211> LENGTH: 30
<212> TYPE: PRT
<213> ORGANISM: SARSCOV-2

<400> SEQUENCE: 3

Ser Leu Gln Ala Arg Asn Asn His Phe Asp Asn Tyr Gly Arg Tyr Gln
1               5                   10                  15

Ala Val Tyr Ser Cys Asn Thr Lys Gln Thr Ser Tyr Val Ala
            20                  25                  30

<210> SEQ ID NO 4
<211> LENGTH: 29
<212> TYPE: PRT
<213> ORGANISM: SARSCOV-2

<400> SEQUENCE: 4

Asn Ala Gly Glu Asn Glu Gln Arg Arg Asn Ile Gln Gly Asn Asp Asp

```
                1               5                   10                  15
Ile Ala Leu Ser Asn Tyr Glu Ala Gly Ser Val Ile Glu
                20                  25

<210> SEQ ID NO 5
<211> LENGTH: 29
<212> TYPE: PRT
<213> ORGANISM: SARSCOV-2

<400> SEQUENCE: 5

Glu Gly Gly Ile Asp Ala Arg Tyr Arg Asp Lys Lys Leu Ser Ala
1               5                   10                  15

Tyr Gly Glu Arg Ala Asp Glu Arg Ser Tyr Val Gly
                20                  25

<210> SEQ ID NO 6
<211> LENGTH: 30
<212> TYPE: PRT
<213> ORGANISM: SARSCOV-2

<400> SEQUENCE: 6

Ala Gln Val Gly Arg Asn Tyr Ser Leu Leu Glu Gln Arg Asp Arg Arg
1               5                   10                  15

Tyr Ser Val Ile Gly Ala Asp Glu Gln Asp Asp Val Ala
                20                  25                  30

<210> SEQ ID NO 7
<211> LENGTH: 29
<212> TYPE: PRT
<213> ORGANISM: SARSCOV-2

<400> SEQUENCE: 7

Ala Ala Ala Gln Trp Tyr Tyr Tyr Ile Ile Ile Arg Arg Val Val Val
1               5                   10                  15

Val Val Cys Cys Cys Ala Ala Ala Thr Tyr Tyr Leu Leu
                20                  25

<210> SEQ ID NO 8
<211> LENGTH: 30
<212> TYPE: PRT
<213> ORGANISM: SARSCOV-2

<400> SEQUENCE: 8

Val Ser Ser Thr Thr Thr Trp Ala Ala Ala Pro Ile Ile His Cys
1               5                   10                  15

Cys Cys Cys Gln Asp Lys Leu Leu Leu Met Tyr Tyr Tyr Val
                20                  25                  30

<210> SEQ ID NO 9
<211> LENGTH: 30
<212> TYPE: PRT
<213> ORGANISM: SARSCOV-2

<400> SEQUENCE: 9

Val Val Val Tyr Tyr Tyr Tyr Tyr Trp Trp Asn Asn Asn Gln Cys Cys
1               5                   10                  15

Leu Leu Leu Leu Val Val Val Asp Asp Asp Asp Gly Phe Phe
                20                  25                  30

<210> SEQ ID NO 10
<211> LENGTH: 30
<212> TYPE: PRT
```

-continued

<213> ORGANISM: SARSCOV-2

<400> SEQUENCE: 10

Ser Ser Ser Met Gly Gly Thr Arg Arg Val Val Lys Cys Asp Asp
1               5                   10                  15

Asp Asp Asn Asn Ala Ala Ala Tyr Tyr Arg Gln Glu Glu Glu
            20                  25                  30

<210> SEQ ID NO 11
<211> LENGTH: 31
<212> TYPE: PRT
<213> ORGANISM: SARSCOV-2

<400> SEQUENCE: 11

Arg Arg Gln Gly Gly Gly Gly Ser Tyr Tyr Tyr Gly Gly Pro His Val
1               5                   10                  15

Val Val Val Ile Arg Asn Asn Asn Tyr Arg Arg Glu Gln Gly Gly
            20                  25                  30

<210> SEQ ID NO 12
<211> LENGTH: 31
<212> TYPE: PRT
<213> ORGANISM: SARSCOV-2

<400> SEQUENCE: 12

Arg Val Val Val Val Thr Thr Val Glu Glu Gly Ala Thr Gln Ser Ser
1               5                   10                  15

Ser Leu Val Arg Gln Asp Asp Asn Lys Leu Leu Leu Arg Ala Asn
            20                  25                  30

<210> SEQ ID NO 13
<211> LENGTH: 30
<212> TYPE: PRT
<213> ORGANISM: SARSCOV-2

<400> SEQUENCE: 13

Asn Asn Asn Gly Phe Phe Gln Asn Val Gly Gly Leu Asp Met Arg Arg
1               5                   10                  15

Arg Gln Val Ala Cys Trp Leu Leu Leu Thr Val Val Arg Asn
            20                  25                  30

<210> SEQ ID NO 14
<211> LENGTH: 30
<212> TYPE: PRT
<213> ORGANISM: SARSCOV-2

<400> SEQUENCE: 14

Glu Cys Ala Pro Lys Asn Glu Glu Gly Arg Tyr Glu Glu Val Ala Gln
1               5                   10                  15

Thr Ser Phe Phe Thr Arg Glu Arg Asn Ser Ala Gly Tyr Asp
            20                  25                  30

<210> SEQ ID NO 15
<211> LENGTH: 30
<212> TYPE: PRT
<213> ORGANISM: SARSCOV-2

<400> SEQUENCE: 15

Asn Asn Asp Cys Gly Ala Ser Phe Arg Gly Glu Tyr Ser Ala Gly Asp
1               5                   10                  15

Arg Lys Glu Ala Ser Tyr Asn Asp Ile Ala Leu Ser Glu Val
            20                  25                  30

<210> SEQ ID NO 16
<211> LENGTH: 30
<212> TYPE: PRT
<213> ORGANISM: SARSCOV-2

<400> SEQUENCE: 16

Asp Glu Glu Ala Lys Asn Tyr Ser Leu Leu Gln Asp Arg Asp Ala Lys
1               5                   10                  15

Leu Gly Val Ala Gly Asp Asp Ile Ser Leu Asn Tyr Ser Gly
            20                  25                  30

<210> SEQ ID NO 17
<211> LENGTH: 30
<212> TYPE: PRT
<213> ORGANISM: SARSCOV-2

<400> SEQUENCE: 17

Gln Arg Arg Asn Gly Leu Phe Arg Ala Tyr Ser Leu Gly Ile Gly Lys
1               5                   10                  15

Ser Leu Ala Tyr Asp Tyr Lys Gly Ser Gln Tyr Asp Val Leu
            20                  25                  30

<210> SEQ ID NO 18
<211> LENGTH: 30
<212> TYPE: PRT
<213> ORGANISM: SARSCOV-2

<400> SEQUENCE: 18

Ser Lys Arg Arg Ala Asp Tyr Ser Glu Ala Arg Asn Tyr Val Lys Ser
1               5                   10                  15

Ala Glu Gly Arg Ala Ser Ser Glu Gly Ser Ala Glu Arg Asp
            20                  25                  30

<210> SEQ ID NO 19
<211> LENGTH: 30
<212> TYPE: PRT
<213> ORGANISM: SARSCOV-2

<400> SEQUENCE: 19

Asp Glu Gln Gly Ser Ala Gly Asn Ser Gln Ile Glu Ser Gln Gln Asn
1               5                   10                  15

Gly Val Ser Gln Asp Asp Lys Gly Glu Asp Asn Ser Arg Leu
            20                  25                  30

<210> SEQ ID NO 20
<211> LENGTH: 31
<212> TYPE: PRT
<213> ORGANISM: SARSCOV-2

<400> SEQUENCE: 20

Arg Lys Lys Tyr Gly Arg Asn Tyr Asp Ser Leu Ser Tyr Lys Asp Gln
1               5                   10                  15

Gln Ala Ser Ile Ser Gln Gly Glu Asn Asp Asp Lys Glu Gln Asp
            20                  25                  30

<210> SEQ ID NO 21
<211> LENGTH: 30
<212> TYPE: PRT
<213> ORGANISM: SARSCOV-2

<400> SEQUENCE: 21

```
Glu Thr Gly His His His His His Thr Asn Leu Cys Pro Phe Gly
1               5                   10                  15

Glu Val Phe Asn Ala Thr Arg Phe Ala Ser Val Tyr Ala Trp
            20                  25                  30
```

<210> SEQ ID NO 22
<211> LENGTH: 30
<212> TYPE: PRT
<213> ORGANISM: SARSCOV-2

<400> SEQUENCE: 22

```
Asn Arg Lys Arg Ile Ser Asn Cys Val Ala Asp Tyr Ser Val Leu Tyr
1               5                   10                  15

Asn Ser Ala Ser Phe Ser Thr Phe Lys Cys Tyr Gly Val Ser
            20                  25                  30
```

<210> SEQ ID NO 23
<211> LENGTH: 30
<212> TYPE: PRT
<213> ORGANISM: SARSCOV-2

<400> SEQUENCE: 23

```
Pro Thr Lys Leu Asn Asp Leu Cys Phe Thr Asn Val Tyr Ala Asp Ser
1               5                   10                  15

Phe Val Ile Arg Gly Asp Glu Val Arg Gln Ile Ala Pro Gly
            20                  25                  30
```

<210> SEQ ID NO 24
<211> LENGTH: 30
<212> TYPE: PRT
<213> ORGANISM: SARSCOV-2

<400> SEQUENCE: 24

```
Gln Thr Gly Lys Ile Ala Asp Tyr Asn Tyr Lys Leu Pro Asp Asp Phe
1               5                   10                  15

Thr Gly Cys Val Ile Ala Trp Asn Ser Asn Asn Leu Asp Ser
            20                  25                  30
```

<210> SEQ ID NO 25
<211> LENGTH: 30
<212> TYPE: PRT
<213> ORGANISM: SARSCOV-2

<400> SEQUENCE: 25

```
Lys Val Gly Gly Asn Tyr Asn Tyr Arg Tyr Arg Leu Phe Arg Lys Ser
1               5                   10                  15

Asn Leu Lys Pro Phe Glu Arg Asp Ile Ser Thr Glu Ile Tyr
            20                  25                  30
```

<210> SEQ ID NO 26
<211> LENGTH: 29
<212> TYPE: PRT
<213> ORGANISM: SARSCOV-2

<400> SEQUENCE: 26

```
Gln Ala Gly Ser Thr Pro Cys Asn Gly Val Glu Gly Phe Asn Cys Tyr
1               5                   10                  15

Phe Pro Gln Ser Tyr Gly Phe Gln Pro Thr Asn Gly Val
            20                  25
```

<210> SEQ ID NO 27
<211> LENGTH: 25

<212> TYPE: PRT
<213> ORGANISM: SARSCOV-2

<400> SEQUENCE: 27

Gly Tyr Gln Pro Tyr Arg Val Val Val Leu Ser Phe Glu Leu Leu His
1 5 10 15

Ala Pro Ala Thr Val Cys Gly Lys Lys
20 25

<210> SEQ ID NO 28
<211> LENGTH: 30
<212> TYPE: PRT
<213> ORGANISM: SARSCOV-2

<400> SEQUENCE: 28

Gln Cys Val Asn Leu Arg Thr Arg Thr Gln Leu Pro Pro Ala Tyr Thr
1 5 10 15

Asn Ser Phe Thr Arg Gly Val Asp Pro Phe Leu Asp Val Tyr
20 25 30

<210> SEQ ID NO 29
<211> LENGTH: 28
<212> TYPE: PRT
<213> ORGANISM: SARSCOV-2

<400> SEQUENCE: 29

Tyr His Lys Asn Asn Lys Ser Trp Met Asp Leu Glu Gly Lys Gln Gly
1 5 10 15

Asn Phe Lys Leu Asp Pro Leu Ser Tyr Gln Thr Ser
20 25

<210> SEQ ID NO 30
<211> LENGTH: 30
<212> TYPE: PRT
<213> ORGANISM: SARSCOV-2

<400> SEQUENCE: 30

Asn Phe Arg Val Gln Pro Thr Ser Val Leu Tyr Asn Ser Ala Ser Phe
1 5 10 15

Ser Thr Phe Lys Cys Tyr Gly Val Ser Pro Thr Lys Leu Asn
20 25 30

<210> SEQ ID NO 31
<211> LENGTH: 29
<212> TYPE: PRT
<213> ORGANISM: SARSCOV-2

<400> SEQUENCE: 31

Asp Phe Val Ile Arg Gly Asp Glu Val Arg Gln Ile Ala Pro Gly Gln
1 5 10 15

Thr Gly Lys Ile Ala Asp Lys Phe Phe Glu Leu Leu His
20 25

<210> SEQ ID NO 32
<211> LENGTH: 27
<212> TYPE: PRT
<213> ORGANISM: SARSCOV-2

<400> SEQUENCE: 32

Ala Pro Ala Thr Val Cys Gly Pro Lys Lys Ser Thr Asn Leu Val Lys
1 5 10 15

Lys Lys Phe Leu Pro Gln Thr Leu Glu Thr Asn

-continued

<210> SEQ ID NO 33
<211> LENGTH: 27
<212> TYPE: PRT
<213> ORGANISM: SARSCOV-2

<400> SEQUENCE: 33

Val Asn Asn Ser Tyr Glu Cys Asp Ile Pro Ala Ser Tyr Gln Thr Gln
1               5                   10                  15

Thr Asn Ser Arg Arg Arg Ala Arg Ser Val Ala
            20                  25

<210> SEQ ID NO 34
<211> LENGTH: 27
<212> TYPE: PRT
<213> ORGANISM: SARSCOV-2

<400> SEQUENCE: 34

Ser Gln Ser Ile Ile Ala Tyr Thr Met Ser Leu Gly Ala Glu Asn Ser
1               5                   10                  15

Val Ala Cys Ser Asn Glu Glu Gln Asp Lys Asn
            20                  25

<210> SEQ ID NO 35
<211> LENGTH: 27
<212> TYPE: PRT
<213> ORGANISM: SARSCOV-2

<400> SEQUENCE: 35

Glu Lys Gln Ile Tyr Lys Thr Pro Pro Ile Lys Asp Phe Gly Gly Phe
1               5                   10                  15

Lys Pro Glu Ala Glu Val Gln Ile Gly Gln Ser
            20                  25

<210> SEQ ID NO 36
<211> LENGTH: 28
<212> TYPE: PRT
<213> ORGANISM: SARSCOV-2

<400> SEQUENCE: 36

Lys Arg Val Asp Phe Cys Phe Tyr Glu Pro Gln Ile Ile Thr Thr Asp
1               5                   10                  15

Val Asn Asn Thr Val Tyr Asp Pro Leu Gln Pro Glu
            20                  25

<210> SEQ ID NO 37
<211> LENGTH: 28
<212> TYPE: PRT
<213> ORGANISM: SARSCOV-2

<400> SEQUENCE: 37

Leu Asp Ser Phe Lys Glu Glu Val Asn Asn Thr Val Tyr Asp Pro Leu
1               5                   10                  15

Gln Pro Glu Leu Asp Ser Phe Lys Glu Glu Leu Asp
            20                  25

<210> SEQ ID NO 38
<211> LENGTH: 28
<212> TYPE: PRT
<213> ORGANISM: SARSCOV-2

<400> SEQUENCE: 38

```
Lys Tyr Phe Lys Asn His Thr Ser Pro Asp Val Asp Leu Gly Asp Ile
1               5                   10                  15

Ser Gly Ile Asn Ala Ser Val Val Asn Ile Lys Glu
            20                  25

<210> SEQ ID NO 39
<211> LENGTH: 26
<212> TYPE: PRT
<213> ORGANISM: SARSCOV-2

<400> SEQUENCE: 39

Asp Lys Tyr Glu Gln Gly Ser Gly Tyr Ile Pro Glu Ala Pro Arg Asp
1               5                   10                  15

Gly Gln Ala Tyr Val Arg Pro Gly Ser Gly
            20                  25

<210> SEQ ID NO 40
<211> LENGTH: 23
<212> TYPE: PRT
<213> ORGANISM: SARSCOV-2

<400> SEQUENCE: 40

Gly Leu Asn Asp Ile Phe Glu Ala Gln Lys Ile Glu Trp His Glu Gly
1               5                   10                  15

Ser Gly His His His His His
            20

<210> SEQ ID NO 41
<211> LENGTH: 33
<212> TYPE: PRT
<213> ORGANISM: SARSCOV-2

<400> SEQUENCE: 41

Asn Glu Lys Gly Asp Ser Val Glu Glu Ala Leu Leu Lys Asn Gly Thr
1               5                   10                  15

Cys Leu Pro Gln Leu Glu Gln Asp Ala Leu Ser Thr Asn His Gly His
            20                  25                  30

Lys

<210> SEQ ID NO 42
<211> LENGTH: 30
<212> TYPE: PRT
<213> ORGANISM: SARSCOV-2

<400> SEQUENCE: 42

Arg Val Asn Ile Asn Ile Val Gly Asp Phe His Leu Ser Thr Ser Leu
1               5                   10                  15

Asp Tyr Lys Ser Phe Lys Thr Ile Val Glu Ser Asn Val Thr
            20                  25                  30

<210> SEQ ID NO 43
<211> LENGTH: 31
<212> TYPE: PRT
<213> ORGANISM: SARSCOV-2

<400> SEQUENCE: 43

Ala Cys Gln Asp Pro Glu Ile Gly Pro Glu His Ser Val Ala Asp Tyr
1               5                   10                  15

His Asn His Ser Asn Ile Glu Thr Arg Leu Arg Lys Gly Gly Arg
            20                  25                  30
```

<210> SEQ ID NO 44
<211> LENGTH: 36
<212> TYPE: PRT
<213> ORGANISM: SARSCOV-2

<400> SEQUENCE: 44

Leu Glu Ala Leu Glu Thr Pro Val Asp Ser Phe Thr Asn Gly Ala Lys
1               5                   10                  15

Lys Gly Gly Ala Pro Ile Lys Gly Val Glu Arg Val Asp Lys Val Leu
            20                  25                  30

Asn Glu Lys Cys
        35

<210> SEQ ID NO 45
<211> LENGTH: 39
<212> TYPE: PRT
<213> ORGANISM: SARSCOV-2

<400> SEQUENCE: 45

Ser Met Thr Tyr Gly Gln Gln Phe Gly Pro Val Thr Lys Ile Lys Pro
1               5                   10                  15

His Val Asn His Glu Gly Ser Asp Asp Thr Leu Arg Ser Glu Ala Phe
            20                  25                  30

Glu Tyr Tyr His Thr Leu Asp
        35

<210> SEQ ID NO 46
<211> LENGTH: 41
<212> TYPE: PRT
<213> ORGANISM: SARSCOV-2

<400> SEQUENCE: 46

Val Lys Ser Val Ala Lys Leu Cys Leu Asp Ala Gly Ile Asn Tyr Val
1               5                   10                  15

Lys Ser Pro Lys Ser Tyr Cys Asn Gly Val Arg Glu Leu Tyr Leu Asn
            20                  25                  30

Ser Ser Asn Val Thr Thr Met Asp Phe
        35                  40

<210> SEQ ID NO 47
<211> LENGTH: 32
<212> TYPE: PRT
<213> ORGANISM: SARSCOV-2

<400> SEQUENCE: 47

Leu Leu Glu Gly Ser Ile Ser Tyr Ser Glu Leu Arg Pro Asp Thr Arg
1               5                   10                  15

Tyr Val Leu Met Glu His Tyr Arg Ala Leu Ser Val Gln Pro Val Gly
            20                  25                  30

<210> SEQ ID NO 48
<211> LENGTH: 31
<212> TYPE: PRT
<213> ORGANISM: SARSCOV-2

<400> SEQUENCE: 48

Asp Arg Gln Thr Ala Gln Ala Ala Gly Thr Tyr Asn Tyr Glu Pro Leu
1               5                   10                  15

Thr Gln Asp His Gln Asn Gly Met Asn Glu Phe Thr Pro Phe Asp
            20                  25                  30

```
<210> SEQ ID NO 49
<211> LENGTH: 31
<212> TYPE: PRT
<213> ORGANISM: SARSCOV-2

<400> SEQUENCE: 49

Pro Glu Pro Thr Pro Glu Glu Pro Val Asn Gln Phe Thr Gly Tyr Leu
1               5                   10                  15

Lys Leu Thr Ile Val Lys Glu Ala Gln Ser His Leu Lys His Gly
            20                  25                  30

<210> SEQ ID NO 50
<211> LENGTH: 32
<212> TYPE: PRT
<213> ORGANISM: SARSCOV-2

<400> SEQUENCE: 50

Glu Asn Pro Thr Ile Gln Lys Glu Val Ile Glu Cys Asp Val Lys Thr
1               5                   10                  15

Thr Glu Glu Gly Val Lys Val Thr Glu Leu Gly Glu Leu Ser Leu Ala
            20                  25                  30

<210> SEQ ID NO 51
<211> LENGTH: 30
<212> TYPE: PRT
<213> ORGANISM: SARSCOV-2

<400> SEQUENCE: 51

Gln Glu Asn Ala Met Lys Ile Gly Thr Leu Asn Val Tyr Gly Glu Asp
1               5                   10                  15

Asp Leu Ser Ala Asp Lys Ile Tyr Val Ser Arg Gly Asp Leu
            20                  25                  30

<210> SEQ ID NO 52
<211> LENGTH: 30
<212> TYPE: PRT
<213> ORGANISM: SARSCOV-2

<400> SEQUENCE: 52

Ser Ser Asp Gly Gly Gly His Tyr Thr Lys Lys Val Val Cys Cys Asp
1               5                   10                  15

Trp Trp Ser Ser Thr Asn Asn Asn Gln Pro Pro Phe Phe Phe
            20                  25                  30

<210> SEQ ID NO 53
<211> LENGTH: 30
<212> TYPE: PRT
<213> ORGANISM: SARSCOV-2

<400> SEQUENCE: 53

His Gly Gly Gly His His Trp Leu Leu Leu Pro Cys Thr Ala Ala Ala
1               5                   10                  15

Cys Asn Leu Thr Tyr Tyr Tyr Val Val Val Val Glu Glu
            20                  25                  30
```